(12) United States Patent
Hanson et al.

(10) Patent No.: US 10,071,517 B2
(45) Date of Patent: Sep. 11, 2018

(54) POLYMER FILTER ASSEMBLY AND METHOD OF SETTING UP AN EXTRUDING SYSTEM UTILIZING THE POLYMER FILTER ASSEMBLY

(71) Applicant: Processing Technologies International, LLC, Aurora, IL (US)

(72) Inventors: Dana R. Hanson, St. Charles, IL (US); Mitchell L. Gritzner, Montgomery, IL (US); Ryan E. Leopold, Aurora, IL (US)

(73) Assignee: Processing Technologies International, LLC, Aurora, IL (US)

( * ) Notice: Subject to any disclaimer, the term of this patent is extended or adjusted under 35 U.S.C. 154(b) by 689 days.

(21) Appl. No.: 14/512,915

(22) Filed: Oct. 13, 2014

(65) Prior Publication Data

US 2016/0101557 A1 Apr. 14, 2016

(51) Int. Cl.
*B29C 47/68* (2006.01)
*B29C 47/00* (2006.01)
*B29C 47/08* (2006.01)

(52) U.S. Cl.
CPC ...... *B29C 47/0021* (2013.01); *B29C 47/0864* (2013.01); *B29C 47/0867* (2013.01); *B29C 47/68* (2013.01)

(58) Field of Classification Search
CPC .................. B29C 47/0867; B29C 47/68
See application file for complete search history.

(56) References Cited

U.S. PATENT DOCUMENTS

| | | | | |
|---|---|---|---|---|
| 4,750,841 A | * | 6/1988 | Hicks ................. | B29C 47/08 248/901 |
| 2002/0092804 A1 | * | 7/2002 | Smith, Jr. ............ | B01D 29/35 210/232 |
| 2003/0115926 A1 | * | 6/2003 | Cutshall ............. | B21D 35/00 72/404 |
| 2011/0069576 A1 | * | 3/2011 | Padmanabhan ... | B01F 15/00928 366/89 |
| 2013/0334730 A1 | * | 12/2013 | Maeder ............. | B29C 47/0806 264/176.1 |

* cited by examiner

*Primary Examiner* — Ryan Ochylski
(74) *Attorney, Agent, or Firm* — Wood, Philips, Katz, Clark & Mortimer

(57) ABSTRACT

A polymer filter assembly through which flowable material from a supply is directed for processing before passing to a die assembly through which the flowable material is delivered to form a sheet layer. The polymer filter assembly has a polymer filter frame that supports processing components for the flowable material and a support assembly for the polymer filter frame. The support assembly includes components cooperating between the polymer filter frame and a base upon which the polymer filter frame is supported to allow controlled relative vertical movement between the polymer filter frame and base to thereby permit controlled alignment between the polymer filter frame and at least one of: a) an upstream component that delivers flowable material from the supply; and b) the die assembly.

22 Claims, 4 Drawing Sheets

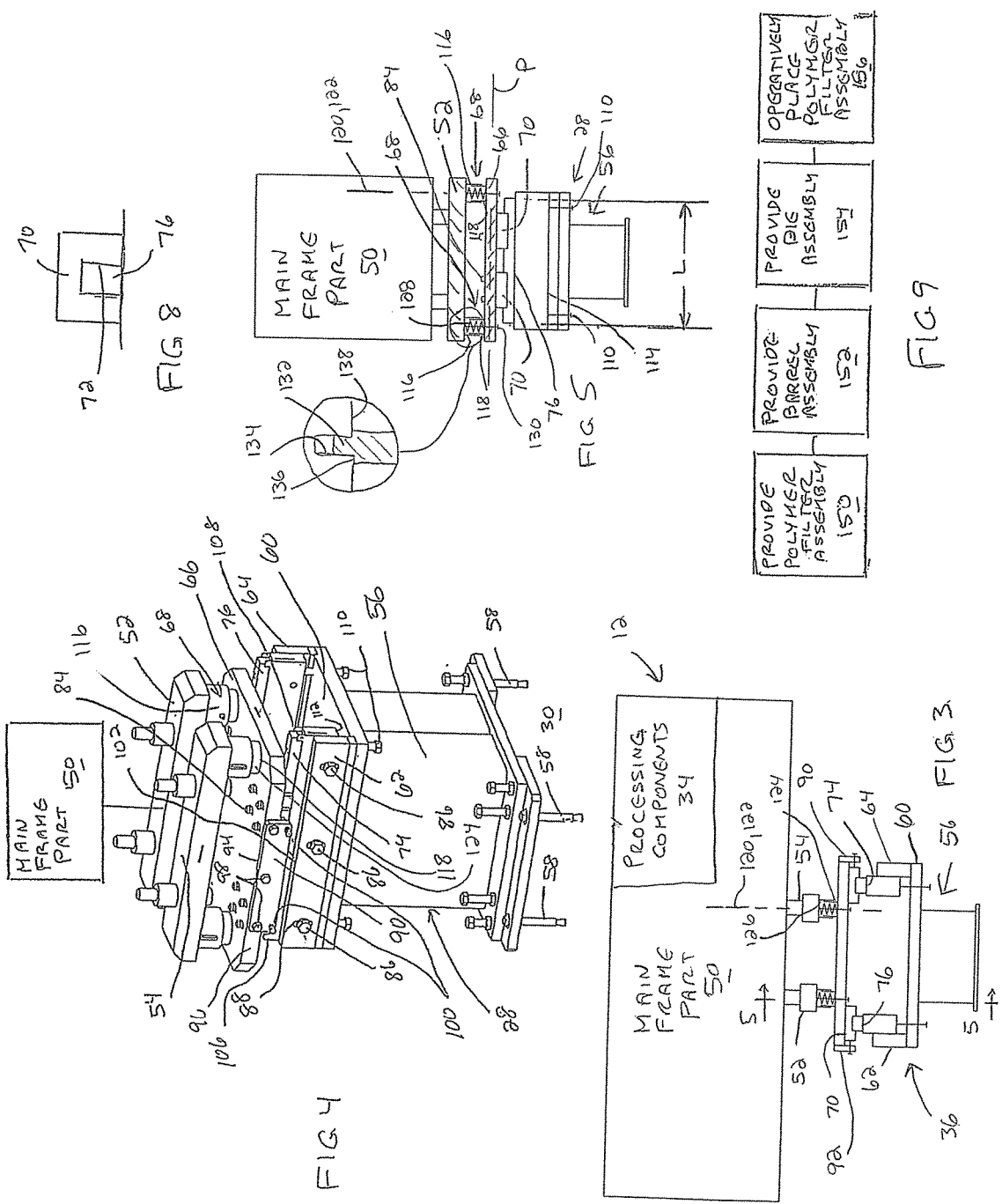

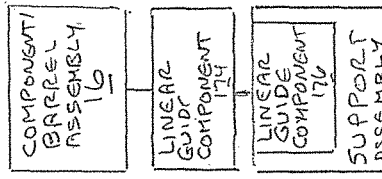
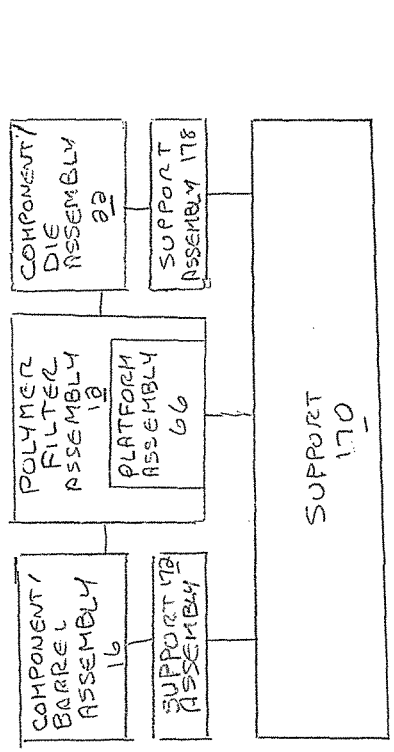
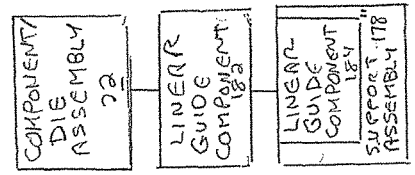
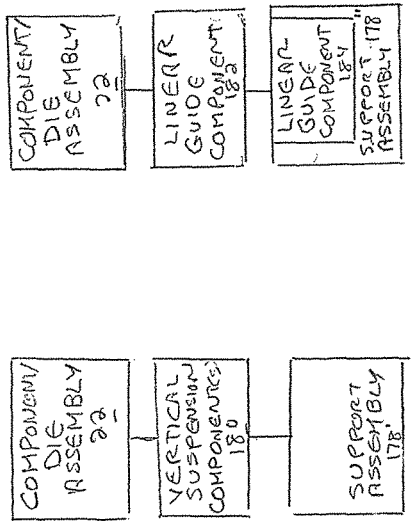
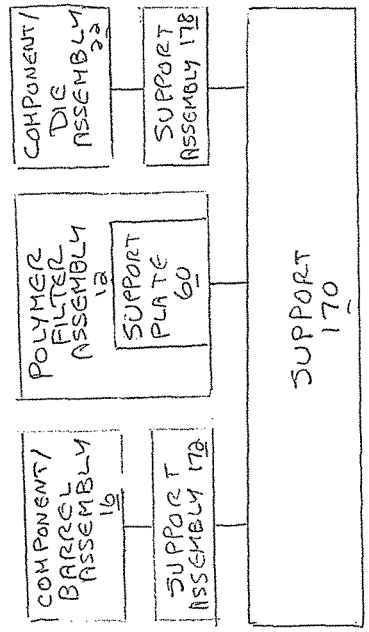

POLYMER FILTER ASSEMBLY AND METHOD OF SETTING UP AN EXTRUDING SYSTEM UTILIZING THE POLYMER FILTER ASSEMBLY

BACKGROUND OF THE INVENTION

Field of the Invention

This invention relates to polymer filter assemblies as used to process/filter a flowable material used to extrusion form sheet layers/products.

Background Art

One basic extrusion sheet forming system utilizes the combination of a barrel assembly, a polymer filter assembly, and a die assembly through which flowable material is delivered from a supply to a processing/roll system through which one or more sheet layers are formed. An exemplary system is shown in U.S. Pat. No. 8,021,140. Flowable material from the supply is delivered through the barrel assembly to the polymer filter assembly, within which filtering of the flowable material takes place. From the polymer filter assembly, the filtered flowable material is directed to the die assembly, which causes a controlled delivery of the flowable material to a processing/roll system upon which the flowable material is solidified and formed into a sheet layer. The sheet layer may be accumulated by itself or united with one or more additional sheet layers to produce a completed product, or an intermediate product that is further processed downstream, or elsewhere.

The polymer filter assembly consists of a frame with contained processing components that collectively may weigh several tons. The polymer filter assembly is operatively engaged with the barrel assembly and die assembly through cooperating connectors that are configured to maintain a precise alignment that is necessary for optimal system performance.

Typically, the cooperating assemblies and connectors therebetween are designed and manufactured with close tolerances. It is difficult with components having large masses and weights, typical for extruding systems, to precisely establish and maintain an intended alignment. This problem is aggravated by the fact that with the system in use, the flowable material is at working temperatures high enough that the components significantly thermally expand and contract. This phenomenon is particularly significant given the different thicknesses and configurations of parts.

In the absence of some accommodation for these conditions, deformation and skewing of parts relationships could compromise the integrity of sheets and products generated. Various modifications have been made to such systems in the past to address these problems.

It is known, for example, to mount a polymer filter assembly by bolting it fixedly to the barrel system without any additional support. It is also known to support a polymer filter on a wheeled cart placed against a horizontal base surface. Both of these designs create out-of-plane loads that are transmitted between cooperating components both upstream and downstream of the polymer filter assembly. Further, these designs do not maintain a precise required alignment between the polymer filter assembly and cooperating upstream and downstream components, nor do they support the weight of the components when a misalignment naturally occurs.

The industry continues to seek designs that better accommodate thermal deformations and potential component misalignment caused by thermally induced dimensional variations and other conditions.

SUMMARY OF THE INVENTION

In one form, the invention is directed to a polymer filter assembly through which flowable material from a supply is directed for processing before passing to a die assembly through which the flowable material is delivered to form a sheet layer. The polymer filter assembly has a polymer filter frame that supports processing components for the flowable material and a support assembly for the polymer filter frame. The support assembly includes components cooperating between the polymer filter frame and a base upon which the polymer filter frame is supported to allow controlled relative vertical movement between the polymer filter frame and base to thereby permit controlled alignment between the polymer filter frame and at least one of: a) an upstream component that delivers flowable material from the supply; and b) the die assembly.

In one form, the cooperating components include a plurality of spring assemblies that act between the polymer filter frame and base and exert an upward biasing force upon the polymer filter frame.

In one form, at least one of the spring assemblies has a first part movable vertically with the polymer filter frame and a second part that is in substantially fixed vertical relationship to the base. The first and second parts cooperate to guide vertical movement of the polymer filter frame relative to the base while confining relative horizontal movement between the polymer filter frame and base.

In one form, the first and second parts are cylindrical in shape respectively with first and second central vertical axes. The first and second parts are aligned with the first and second axes substantially coincident and configured so that the first and second parts are movable vertically, each relative to the other, into different axially overlapping relationship as an incident of the polymer filter frame moving vertically relative to the base.

In one form, the at least one spring assembly has a vertical biasing component.

In one form, the at least one spring assembly further includes a vertical biasing component that resides within a space bounded by one of the first and second parts.

In one form, the vertical biasing component is in the form of a coil spring.

In one form, the polymer filter assembly has an inlet end and an outlet end spaced along a flow path for the flowable material. The support assembly further includes components cooperating between the polymer filter frame and base to allow controlled relative horizontal movement between the polymer filter frame and base to thereby permit controlled alignment between the polymer filter frame and at least one of: a) the upstream component; and b) the die assembly.

In one form, the support assembly further includes a platform assembly upon which the polymer filter frame bears. The cooperating components that allow controlled relative horizontal movement between the polymer filter frame and base include at least one rail on one of the platform assembly and base and a first slot on the other of the platform assembly and base. The one rail and first slot are configured so that the one rail and first slot cooperate to guide movement of the polymer filter frame relative to the base in a substantially first linear path that is generally aligned with the flow path.

In one form, the cooperating components that allow controlled relative horizontal movement between the polymer filter frame and base further include another rail and a second slot. The another rail and second slot are provided one each on the platform assembly and base and are configured so that the another rail and second slot cooperate to guide movement of the polymer filter frame relative to the base in a substantially second linear path that is substantially parallel to the first linear path.

In one form, the cooperating components that allow controlled relative vertical movement between the polymer filter frame and base include a plurality of spring assemblies that act between the platform assembly and polymer filter frame and exert an upward biasing force upon the polymer filter frame.

In one form, the plurality of spring assemblies are configured and cooperate between the polymer filter frame and base to allow the polymer filter frame to be vertically angularly reoriented relative to the base.

In one form, the polymer filter assembly further includes an adjusting assembly through which the polymer filter frame can be shifted relative to the base in a direction transversely to the first linear path.

In one form, through the adjusting assembly the polymer filter frame is shifted relative to the base in the direction transversely to the first linear path by changing a position of the one rail in the first slot in the direction transversely to the first linear path.

In one form, the polymer filter assembly further includes an adjusting assembly through which a vertical angular orientation of the one rail relative to the base is changed.

In one form, the polymer filter assembly further includes a height adjustment mechanism through which downward movement of the polymer filter assembly frame relative to the base is blocked with the polymer filter assembly frame at a plurality of different selectable heights relative to the base.

In one form, the polymer filter assembly is provided in combination with the die assembly and the polymer filter frame is guidingly movable relative to the die assembly through the support assembly.

In one form, the polymer filter assembly is provided in combination with a barrel assembly through which flowable material is directed from a supply of the flowable material to the polymer filter assembly. The polymer filter frame is guidingly movable relative to the barrel assembly through the support assembly.

In one form, the platform assembly has a flat plate with a central plane that is horizontally oriented. The one rail and first slot and another rail and second slot cooperate between the flat plate and the base.

In one form, the invention is directed to a method of setting up an extruding system. The method includes the steps of: providing a polymer filter assembly as described above; providing a die assembly through which flowable material is delivered to form a sheet layer; and operatively placing the polymer filter assembly in relationship to each of the barrel assembly and die assembly so that: a) flowable material can be delivered from the barrel assembly to the die assembly through the polymer filter assembly; and b) the polymer filter frame can move relative to at least one of the barrel assembly and die assembly through the support assembly to at least one of: i) allow manual alignment between the polymer filter frame and at least one of the barrel assembly and die assembly; and ii) accommodate thermal expansion and contraction of the barrel assembly, polymer filter assembly, and die assembly.

BRIEF DESCRIPTION OF THE DRAWINGS

FIG. 3 is a reduced, end elevation view of the inventive polymer filter assembly as in FIG. 1;

FIG. 4 is a partially schematic, perspective view of the polymer filter assembly in FIG. 3;

FIG. 5 is a cross-sectional view of the polymer filter assembly taken along line 5-5 of FIG. 3;

FIG. 8 is an enlarged, fragmentary, end elevation view of a guide rail and linear bearing used to guide relative movement between parts on the polymer filter assembly and a base therefor;

FIG. 9 is a flow diagram representation of a method of setting up an extruding system utilizing the polymer filter assembly according to the invention;

FIG. 10 is a schematic representation of the inventive extruding system, including the embodiment as shown in FIG. 1;

FIG. 11 is a schematic representation as in FIG. 10 wherein the polymer filter assembly is mounted in a different manner relative to a primary system support;

FIG. 12 is a schematic representation of the component/barrel assembly in FIGS. 10 and 11 with a modified form of support assembly through which the component/barrel assembly is mounted relative to the primary system support;

FIG. 13 is a schematic representation of a support assembly for the component/die assembly as shown in FIGS. 10 and 11 and modified from the support assembly therein; and FIG. 14 is a view as in FIG. 13 of a further modified form of support assembly for the component/die assembly.

DETAILED DESCRIPTION OF THE PREFERRED EMBODIMENT

Figure 1:
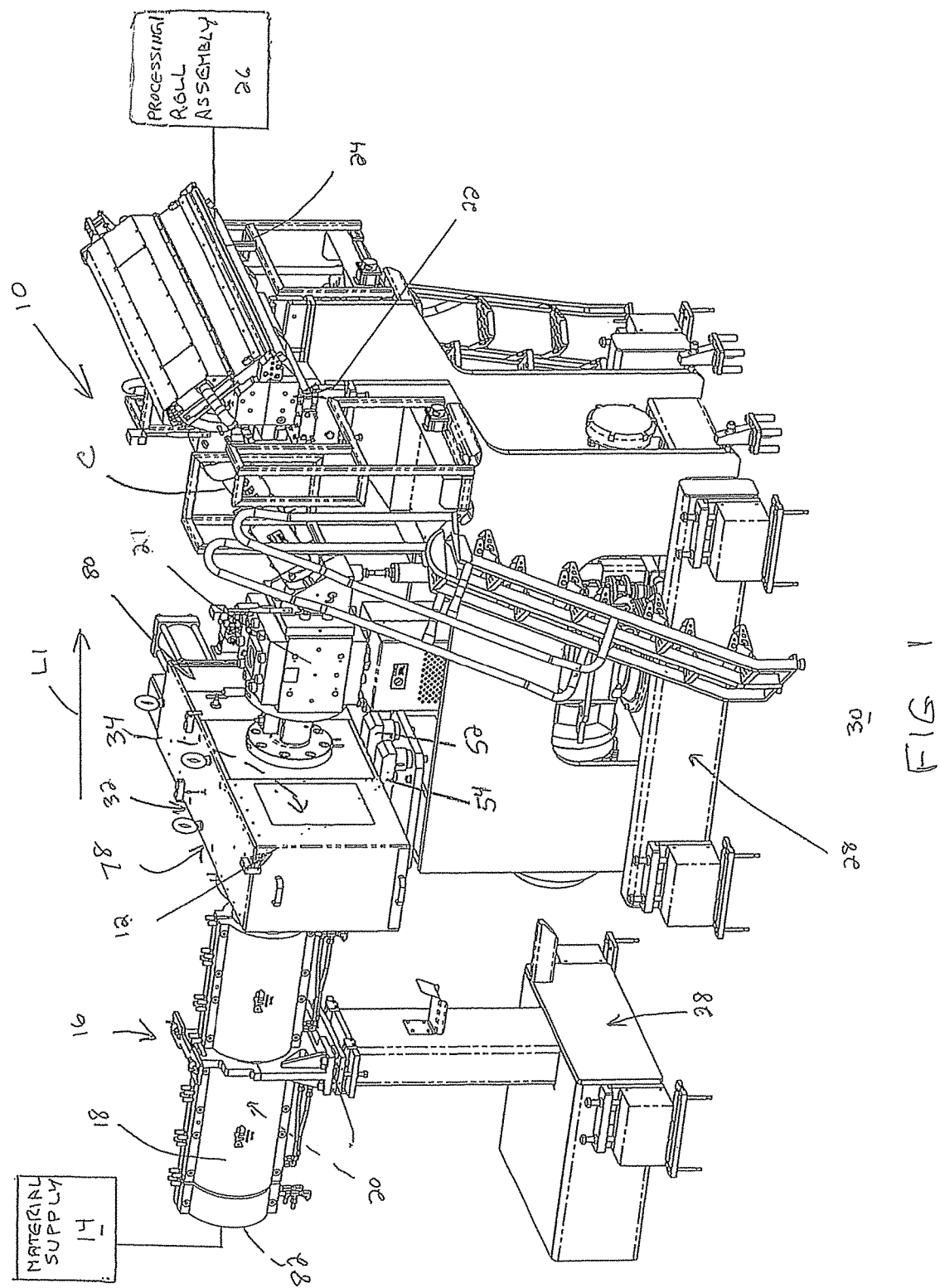
FIG. 1 is a perspective view of an extruding system with a polymer filter assembly, according to the present invention, incorporated.
Figure 6:
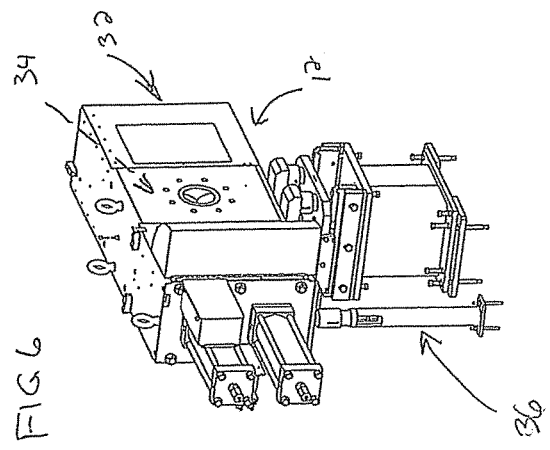
FIG. 6 is a reduced, perspective view of the polymer filter assembly in FIG. 3.
Figure 7:
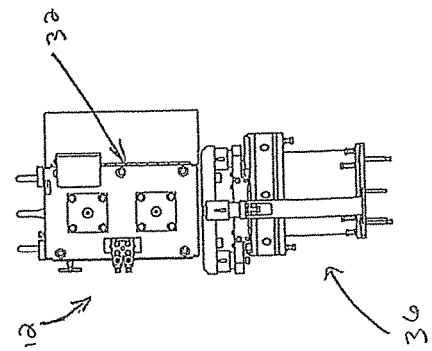
FIG. 7 is a reduced, side elevation view of the polymer filter assembly in FIG. 3.

In FIG. 1, an extruding system is shown at 10 incorporating a polymer filter assembly 12, according to the present invention. Flowable material, such as a polymer, from a supply 14 thereof, is delivered to the polymer filter assembly 12 through a barrel assembly 16. The barrel assembly 16 includes a conduit 18 bounding an internal passageway 20 through which the flowable material moves guidingly in a flow path between the supply 14 and the polymer filter assembly 12.

In the polymer filter assembly 12, the polymer melt is filtered and staged for recycling. The filtered material is delivered from the polymer filter assembly 12 through a pump 21 thereon to a die assembly 22. Though the pump 21 is shown as a separate component, it will be treated herein as a unitary part of the polymer filter assembly 12. The flowable material exits from the die assembly 22 at a discharge location 24 at which the flowable material is strategically applied upon one or more components/rolls, generically identified in FIG. 1 as a processing/roll assembly 26.

The nature of the roll assembly 26 and the particular sheet/sheet product formed thereon are not critical to the present invention, as virtually an unlimited number of different designs, for different products and manufacturing processes, are available. The processing/roll assembly may be in the form of a horizontal roll stand, a J-stack arranged roll stand, a vertically arranged roll stand, etc. Sheet formation is described generally in U.S. Pat. No. 8,021,140, the disclosure of which is incorporated herein by reference.

Typically, the barrel assembly 16, polymer filter assembly 12, and die assembly 22 are separately formed sub-assemblies that are operatively connected at an extrusion site upon a base 28, in this case made up of spaced, vertical extensions of a subjacent primary support surface 30. For purposes of this disclosure, the "base" will be considered to be made up of the base components 28 and the subjacent surface 30 upon which they are stably supported.

Figure 2:
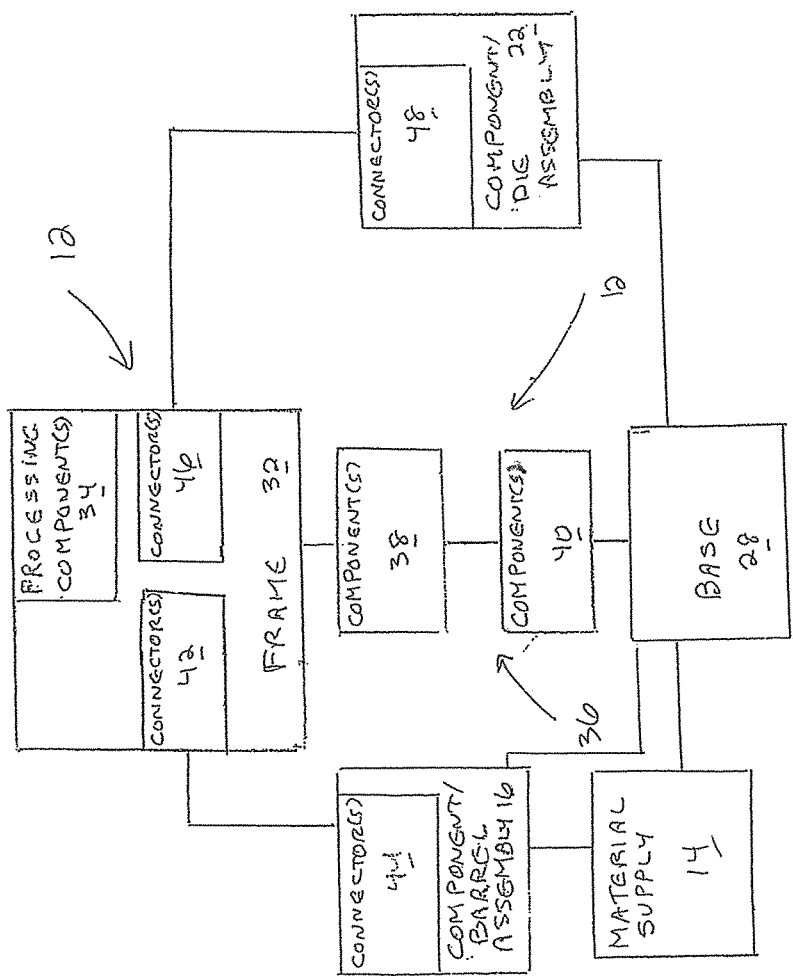
FIG. 2 is a schematic representation of an extruding system, according to the invention, and including the components in the system in FIG. 1.

In FIG. 2, there is a schematic representation of the polymer filter assembly 12 in relationship to the cooperating component/barrel and component/die assemblies 16, 22, respectively. The schematic showing of the assemblies 12, 16, 22 is intended to encompass the specific components therein, described hereinbelow, and other variations of components making up these assemblies. Particularly with respect to the polymer filter assembly 12, the invention contemplates virtually a limitless number of different variations of the components making up the polymer filter assembly 12, as described hereinbelow.

The polymer filter assembly 12 consists of a frame 32 that supports processing components 34. The precise nature of the processing components 34 is not critical to the present invention. There currently exist many variations of such processing components that perform the functions described herein.

The polymer filter assembly 12 is further made up of a support assembly at 36 for the frame 32. One form of the support assembly 36 consists of at least one component 38 associated with the frame 32 and at least one other component 40 associated with the base 28. The cooperating components 38, 40 may alternatively both be on one or the other of the frame 32 and base 28. The components 38, 40 cooperate between the polymer filter frame 32 and base 28 to allow controlled relative movement between the polymer filter frame 32 and base 28 to thereby permit controlled alignment between the polymer filter frame 32 and at least one of: a) a cooperating upstream component, in this depiction the barrel assembly 16, that delivers flowable material from the supply 14; and b) a downstream component, in this case the die assembly 22.

The relative movement between the polymer filter frame 32 and components 16, 22 occurs in at least one dimension, such as vertically and/or horizontally, as through controlled, guided translation. Most preferably, controlled, multi-dimensional movement of the polymer filter assembly frame 32 relative to the base 28 and components 16, 22 is contemplated to effectively allow precision alignment of the various assemblies 14, 16, 22 and accommodate misalignments that may be caused by manufacturing variances, field conditions, and/or thermal dimensional variations.

As depicted, there is at least one connector 42 on the frame 32 that cooperates with at least one connector 44 on the component/barrel assembly 16 to maintain the proper operative relationship. Similarly, there is at least one connector 46 on the frame 32 that cooperates with at least one connector 48 on the component/die assembly 22 to maintain an operative relationship between the frame 32 and component/die assembly 22. Typically, a conduit C (FIG. 1), with either an in-line or gooseneck configuration will be provided to communicate the filtered polymer. For purposes of this disclosure, the conduit C can be considered to be part of either the polymer filter assembly 12 or the die assembly 22.

Details of a specific form of the polymer filter assembly 12, as depicted in FIG. 1, and schematically in FIG. 2, are shown in FIGS. 3-8.

In the depicted embodiment for the polymer filter assembly 12, the frame 32 that supports the processing components 34 consists of a main frame part 50 that is fixedly secured to underlying, mounting frame parts 52, 54.

The frame 32 is supported on a pedestal 56 that makes up part of the base 28. The pedestal 56 has a number of depending leveling feet 58 that bear upon the subjacent surface 30. By adjusting the levelling feet 58, the pedestal 56 can be stably supported upon the subjacent surface 30, even when the subjacent surface 30 has contours causing a deviation from a level, planar shape. The leveling feet 58 can also be used as part of an adjusting mechanism to adjust a vertical and angular relationship between the polymer filter assembly 12 and the cooperating component/barrel assembly 16 and component/die assembly 22.

At the top of the pedestal 56, a horizontally oriented support plate 60 is fixedly mounted. Laterally spaced side plates 62, 64 project upwardly from the support plate 60 and are fixedly connected thereto.

A series of components cooperate directly and indirectly between the mounting frame parts 52, 54 and the pedestal 56, which includes the support plate 60 and side plates 62, 64. These components, as described hereinbelow, are intended to correspond generally to the components 38, 40 described schematically in FIG. 2.

In the embodiment depicted, the polymer filter frame 32 bears upon a platform assembly 66 through a series of like spring assemblies 68.

The platform assembly 66 has a plurality, in this case four, like bearings 70 bolted thereto in a depending fashion. Each bearing 70 defines a downwardly opening slot 72. The bearings 70 function as linear bearings and engage laterally spaced rails 74, 76, respectively associated with the side plates 62, 64.

The rails 74, 76 have the same construction. Exemplary rail 76 nests in the slot 72 on the bearing 70, as shown in FIG. 8. The rails 74, 76 are oriented in parallel relationship so that their lengths L are substantially the same, parallel, and substantially aligned with a flow path line L1 through the polymer filter assembly 12 between inlet and outlet ends 78, 80, respectively. The flow path direction, identified by the line L1, is substantially the same as the overall system flow path direction between an inlet 82 to the conduit 18 and the discharge location 24 on the die assembly 22.

In this embodiment, the linear bearings 70 are secured by threaded fasteners 84 directed downwardly through the platform assembly 66 so that two of the linear bearings 70 cooperate with each of the rails 74, 76 in the same manner.

The rails 74, 76 are secured to their respective side plates 62, 64 in like manner. For exemplary rail 74, threaded fasteners 86 extend through the side plate 62 and draw the rail 74 thereagainst. Openings 88 through the plate 62, to accept the fasteners 86, are vertically elongate, whereby the angular orientation of the rail 74 can be adjusted and maintained through a limited range.

Additional rail adjustment is made possible through side-to-side adjustment plates 90, 92, respectively associated with the rails 74, 76. The side-to-side adjustment plates 90, 92 function in the same manner. Exemplary plate 90 has a top portion 94 fixedly secured to the perimeter edge 96 of the platform assembly 66 through a series of threaded fasteners 98. Threaded adjusting bolts 100 extend through a portion 102 of the plate 90 that extends below the platform assembly 66. Advancing the adjusting bolts 100 urges the rail 74 towards the opposite rail 76. This slight adjustment can be accommodated by loosening the fasteners 86.

As will be explained in greater detail below, with the mounting frame parts 52, 54 fixedly secured to the main frame part 50 through threaded fasteners 104, the mounting frame parts 52, 54 move as one piece therewith. The weight of the frame 32 is borne by the spring assemblies 68 atop the platform assembly 66. The platform assembly 66 is in turn guided precisely through the linear bearings 70 along the rails 74, 76 within a limited lengthwise range as determined by spaced stops 106, 108 which abut the linear bearings 70 at each end of its travel range.

Additional reinforcement is provided for the rails 74, 76 by a series of strategically placed threaded adjusting bolts 110 projecting upwardly through the support plate 60 to against the undersides 112, 114 of the rails 74, 76, respectively.

As noted above, the spring assemblies 68 each makes up a cooperating component arrangement acting between the polymer filter frame 32 and base 28 by exerting an upward supporting and biasing force upon the polymer filter frame 32. Each of the spring assemblies 68 has the same construction, but this is not a requirement. In the embodiment depicted, there are two spring assemblies 68 associated with each mounting frame part 52, 54, with the spring assemblies 68 spaced to reside adjacent the opposite lengthwise ends thereof.

Each spring assembly 68 consists of a first part 116 that is movable vertically with the polymer filter frame 32. A second part 118 is substantially fixed in vertical relationship to the base 28. In the depicted embodiment, the first and second parts 116, 118 are cylindrical in shape, with first and second central, vertical axes 120, 122, respectively, that, in the depicted embodiment, are substantially coincident. A cylindrical outer surface 124 on the second part 118 is complementary to a cylindrical inner surface 126 on the first part 116 whereby the surfaces 124, 126 cooperate to guide relative movement between the first and second parts 116, 118 along their axes 120, 122. With this arrangement, the first and second parts 116, 118 can be placed in different axially overlapping relationships as an incident of the polymer filter frame 32 moving vertically relative to the base 28. At the same time, the interacting guide surfaces 124, 126 confine relative horizontal movement between the first and second parts 116, 118. As a consequence, collectively the surfaces 124, 126 effectively block relative horizontal movement between the polymer filter frame 32 and base 28 through the spring assemblies 68.

A vertical biasing component 128 resides within a cylindrical space bounded by the second part 118 and acts between the platform assembly 66 and its respective mounting frame part 52, 54. In the depicted embodiment, the biasing component 128 is in the form of a coil spring. However, any component capable of exerting an adequate biasing force to support the weight of the polymer filter assembly frame 32 is contemplated.

By reason of providing multiple spring assemblies 68 in the arrangement shown, the spring assemblies 68 may cooperatively support the polymer filter assembly frame 32 in a level horizontal position. The spring assemblies 68, however, do permit a modicum of vertical angular reorientation that may be optimal to establish the exact, desired connection between the component/barrel assembly 16 and/or component/die assembly 22. The vertical angular change may be from end-to-end or side-to-side or combinations thereof.

The linear bearings 70 and the rails 74, 76 make up another arrangement of components cooperating between the polymer filter frame 32 and base 28 that allow controlled relative horizontal movement between the polymer filter frame 32 and base 28 to thereby permit controlled alignment between the polymer filter frame 32 and at least one of the component/barrel assembly 16 and component/die assembly 22.

To achieve this end, it is possible that a single linear bearing 70 and rail 74, 76 combination might be utilized. For stability and more positive guidance, a two rail arrangement is preferred, with each of the rails and slots configured so that the rails and slots cooperate to guide the polymer filter frame relative to the base in a substantially first linear path that is generally aligned with the overall system flow path.

There is no requirement that either or both rails 74, 76 be on the base 28. That is, the arrangement of the linear bearings 70 and rails 74, 76 can be reversed. Alternatively, one rail 74, 76 might be provided on the platform assembly 66 with the other rail 74, 76 being provided on the base 28 to cooperate with the linear bearings 70 in like fashion.

Within the generic showing of FIG. 2, and as an alternative to the slot and rail arrangement specifically described, the linear guiding of the polymer filter frame 32 relative to the base 28 may be accomplished using other types of structures, to include captured cam followers, captured wheel arrangements, etc. One example of such an arrangement is shown in U.S. Pat. No. 8,021,140. Low friction guided movement is a design objective, regardless of the particular construction.

Each of the side-to-side adjustment plates 90, 92 is part of a separate adjusting assembly through which the polymer filter frame 32 can be shifted relative to the base 28 in a direction transversely to the linear path for the polymer filter frame 32. By shifting one or both of the rails 74, 76 transversely to its length by turning the adjusting bolts 100, precise alignment of each rail 74, 76 within its respective slot 72 can be effected. At the same time, the polymer filter frame 32 is itself shifted relative to the base 28, through this adjustment, which may be desirable to make a precisely aligned connection between the polymer filter assembly 12 and the component/barrel assembly 16 and/or component/die assembly 22.

The aforementioned adjusting bolts 110 make up another adjusting assembly through which the vertical height and/or angular orientation of the rails 74, 76 can be changed for proper component alignment and/or to facilitate more precise alignment between the rails 74, 76 and the slots 72 in the associated linear bearings 70. This angular adjustment is made possible by situating the adjusting bolts 110 at the lengthwise ends of the rails 74, 76.

In this embodiment, height adjustment bolts 130 are threaded through the platform 66 and extend through the biasing component 128 on each spring assembly 68. Each bolt 130 has an unthreaded, reduced diameter end 132 that is received in a blind bore 134 on the associated mounting frame part 52, 54. An annular shoulder 136 is defined where the diameter changes to abut to the bottom 138 of the exemplary frame mounting part 52. The shoulder 136 blocks downward movement of the polymer filter frame 32 relative to the base. By turning the bolt 130 in opposite directions around its length, the height of the shoulder 136 can be changed to allow selection of a plurality of different heights for the polymer filter frame 32 at which it will be blocked relative to the base 28.

In this embodiment, the platform assembly 66 is in the form of a flat plate with a central plane P that is horizontally oriented. However, this construction is not required.

With the inventive structure, as described above, a method of setting up an extruding system can be carried out as shown in flow diagram form in FIG. 9.

As shown at block 150, a polymer filter assembly is provided, as described above. As shown at block 152, a barrel assembly is provided, as described above. As shown at block 154, a die assembly is provided, as described above. As shown at block 156, the polymer filter assembly is operatively placed in relationship to each of the barrel assembly and die assembly so that: a) flowable material can be delivered from the barrel assembly to the die assembly through the polymer filter assembly; and b) the polymer filter frame can move relative to at least one of the barrel assembly and die assembly through the support assembly to at least one of: i) allow manual alignment between the polymer filter frame and at least one of the barrel assembly and die assembly; and ii) accommodate thermal expansion and contraction of the barrel assembly, polymer filter assembly, and die assembly.

It is possible, with the above components, to control out-of-plane movement of the polymer filter frame 32 in all but a direction parallel to the system flow path. Controlled vertical movement of the polymer filter frame 32 is possible while vertical angular movement may also be permitted.

Design features permit precision alignment to occur and adjustments to be made to the position and orientation of the polymer filter frame 32 to adjust for any misalignments that are observed by sliding the polymer filter frame 32 (unbolted from the upstream barrel assembly) and observing the precision alignment of mating pilot and counter bores of mating surfaces. Thus up/down, side-to-side and tilt adjustments can be made to assure proper alignment.

The above construction potentially removes overhung loads from being transferred structurally to the adjacent components while supporting the subject component's mass via the suspension (spring assemblies) and allows for unrestricted thermal motion to occur as needed in the flow direction due to the machine operating temperature as metal components expand/contract.

FIGS. 10 and 11 show alternative manners of mounting the polymer filter assembly 12 relative to a primary system support 170 defining the aforementioned surface 30. These Figures also generically show structure for operatively mounting the component/barrel assembly 16 and component/die assembly 22 relative to the support 170. The generic showing is intended to encompass different mounting structures and combinations thereof, some of which are detailed in FIGS. 12-14, as described hereinbelow.

In FIG. 10, the polymer filter assembly 12 is shown mounted to the support 170 as in FIGS. 3-8. That is, the support plate 60 is fixed in relationship to the support 170 and the platform assembly 66 is movable relative thereto as described above.

In FIG. 11, the linear guide structure, including the rail 74, 76, is eliminated, whereby the platform assembly 66 is directly or indirectly fixed in relationship to the support 170. Thus, the polymer filter assembly 12 is supported biasably in a vertical direction, but is not movable through any guide structure relative to the support generally in a direction parallel to the flow path, as indicated by the line L1 in FIG. 1. In each arrangement for the polymer filter assembly 12 in FIGS. 10 and 11, the component/barrel assembly 16 and component/die assembly 22 may be mounted in different manners, with the same objective of accommodating dimensional variations, and relative movement between components that may be otherwise imparted, that affects alignment between those components.

In FIGS. 10 and 11, the component/barrel assembly 16 is shown with an intermediate support assembly 172 through which the component/barrel assembly is substantially fixed against lengthwise movement relative to the polymer filter assembly 12, i.e., generally in the line of the flow path as indicated by the arrow L1 in FIG. 1.

Alternatively, as shown in FIG. 12, the support assembly 172' is configured to utilize linear guide components 174, 176 that cooperate between the component/barrel assembly 16 and support assembly 172' to guide movement of the component/barrel assembly 16 in a lengthwise direction relative to the polymer filter assembly 12 as configured in either FIG. 10 or FIG. 11. The linear guide components 174, 176 are not limited in terms of how they are constructed. Ideally, they are similar to those described above for guiding the platform assembly 16 relative to the pedestal 56.

In FIGS. 10 and 11, the component/die assembly 22 is shown mounted to the primary system support 170 through a support assembly 178. The support assembly 178 may be configured so that the component/die assembly 22 is fixed in relationship to the support 170.

Two alternative forms of the support assembly 170 are shown in FIGS. 13 and 14, which can be used separately or together.

In FIG. 13, the support assembly 178' is configured so that there is at least one vertical suspension component 180 that preferably biasably suspends the component/die assembly relative to the support 170. The suspension component(s) 180 may support the component/die assembly 22 from above and/or below.

In FIG. 14, the support assembly 178" is configured so that there are linear guide components 182, 184 that are configured to cooperate and guide lengthwise movement between the component/die assembly and support 170, i.e., along the flow path as indicated by the line L1 in FIG. 1.

For each of the structures that utilizes linear guide components, ideally the components are the same as, or similar to, those described above to guide relative movement between the platform assembly 66 and pedestal 56. Other structure, including structure that does not precisely guide linear movement could also be utilized.

As mentioned above, the two different polymer filter assembly configurations, as shown in FIGS. 10 and 11, can be used with any combination of the support assemblies 172, 172', 178, 178', 178" as a preferred system layout may dictate. As an example, the polymer filter assembly configuration in FIG. 10 may be used with either support assembly 172, 172' for the component/barrel assembly 16 configured as in FIGS. 10-12, together with any one, or combination of, the support assemblies 178, 178', 178" for the component/die assembly 22 as shown in FIGS. 10, 11, 13, and 14. This combination and other combinations are contemplated.

The foregoing disclosure of specific embodiments is intended to be illustrative of the broad concepts comprehended by the invention.

The invention claimed is:

1. A polymer filter assembly through which flowable material from a supply is directed for processing before passing to a die assembly through which the flowable material is delivered to form a sheet layer, the polymer filter assembly comprising:
a polymer filter frame that supports processing components for the flowable material; and
a support assembly for the polymer filter frame, the support assembly comprising:
components cooperating between the polymer filter frame and a base upon which the polymer filter frame is supported to allow controlled relative vertical movement between the polymer filter frame and base to thereby permit controlled alignment between the polymer filter frame and at least one of: a) an upstream component that delivers flowable material from the supply; and b) the die assembly, wherein the cooperating components comprise a spring assembly that acts between the polymer filter frame and base and exerts an upward biasing force upon the polymer filter frame, the polymer filter assembly provided in combination with the die assembly, wherein the polymer filter frame is guidingly movable relative to the die assembly through the support assembly.

2. The polymer filter assembly according to claim 1 wherein the cooperating components comprise a plurality of spring assemblies that act between the polymer filter frame and base and exert an upward biasing force upon the polymer filter frame.

3. The polymer filter assembly according to claim 1 wherein the polymer filter assembly has an inlet end and an outlet end spaced along a flow path for the flowable material, wherein the support assembly further comprises components cooperating between the polymer filter frame and base to allow controlled relative horizontal movement between the polymer filter frame and base to thereby permit controlled alignment between the polymer filter frame and at least one of: a) the upstream component; and b) the die assembly.

4. The polymer filter assembly according to claim 1 in combination with a barrel assembly through which flowable material is directed from a supply of the flowable material to the polymer filter assembly and the polymer filter frame is guidingly movable relative to the barrel assembly through the support assembly.

5. A method of setting up an extruding system, the method comprising the steps of:
providing a polymer filter assembly as in claim 4;
providing a die assembly through which flowable material is delivered to form a sheet layer; and
operatively placing the polymer filter assembly in relationship to each of the barrel assembly and die assembly so that: a) flowable material can be delivered from the barrel assembly to the die assembly through the polymer filter assembly; and b) the polymer filter frame can move relative to at least one of the barrel assembly and die assembly through the support assembly to at least one of: i) allow manual alignment between the polymer filter frame and at least one of the barrel assembly and die assembly; and ii) accommodate thermal expansion and contraction of the barrel assembly, polymer filter assembly, and die assembly.

6. A polymer filter assembly through which flowable material from a supply is directed for processing before passing to a die assembly through which the flowable material is delivered to form a sheet layer, the polymer filter assembly comprising:
a polymer filter frame that supports processing components for the flowable material; and
a support assembly for the polymer filter frame, the support assembly comprising:
components cooperating between the polymer filter frame and a base upon which the polymer filter frame is supported to allow controlled relative vertical movement between the polymer filter frame and base to thereby permit controlled alignment between the polymer filter frame and at least one of: a) an upstream component that delivers flowable material from the supply to the polymer filter assembly; and b) the die assembly, wherein the cooperating components comprise a plurality of spring assemblies that act between the polymer filter frame and base and exert an upward biasing force upon the polymer filter frame, wherein at least one of the spring assemblies comprises a first part movable vertically with the polymer filter frame and a second part that is in substantially fixed vertical relationship to the base, the first and second parts cooperating to guide vertical movement of the polymer filter frame relative to the base while confining relative horizontal movement between the polymer filter frame and base, wherein the first and second parts have first and second central vertical axes, the first and second parts aligned with the first and second axes substantially coincident and configured so that the first and second parts are movable vertically, each relative to the other, into different axially overlapping relationship as an incident of the polymer filter frame moving vertically relative to the base.

7. The polymer filter assembly according to claim 1 wherein the spring assembly comprises a first part movable vertically with the polymer filter frame and a second part that is in substantially fixed vertical relationship to the base, the first and second parts cooperating to guide vertical movement of the polymer filter frame relative to the base while confining relative horizontal movement between the polymer filter frame and base.

8. The polymer filter assembly according to claim 7 wherein the first and second parts are cylindrical in shape respectively with first and second central vertical axes, the first and second parts aligned with the first and second axes substantially coincident and configured so that the first and second parts are movable vertically, each relative to the other, into different axially overlapping relationship as an incident of the polymer filter frame moving vertically relative to the base.

9. The polymer filter assembly according to claim 6 wherein the at least one spring assembly further comprises a vertical biasing component that resides within a space bounded by one of the first and second parts.

10. The polymer filter assembly according to claim 6 wherein the at least one spring assembly comprises a vertical biasing component.

11. The polymer filter assembly according to claim 10 wherein the vertical biasing component is in the form of a coil spring.

12. The polymer filter assembly according to claim 6 in combination with the die assembly and the polymer filter frame is guidingly movable relative to the die assembly through the support assembly.

13. A polymer filter assembly through which flowable material from a supply is directed for processing before passing to a die assembly through which the flowable material is delivered to form a sheet layer, the polymer filter assembly comprising:
a polymer filter frame that supports processing components for the flowable material; and
a support assembly for the polymer filter frame, the support assembly comprising:
components cooperating between the polymer filter frame and a base upon which the polymer filter frame is supported to allow controlled relative vertical movement between the polymer filter frame and base to thereby permit controlled alignment between the polymer filter frame and at least one of: a) an upstream component that delivers flowable material from the supply; and b) the die assembly, wherein the polymer filter assembly has an inlet end and an outlet end spaced along a flow path for the flowable material, wherein the support assembly further comprises components cooperating between the polymer filter frame and base to allow controlled relative horizontal movement between the polymer filter frame and base to thereby permit controlled alignment between the polymer filter frame and at least one of: a) the upstream component; and b) the die assembly.

14. The polymer filter assembly according to claim 13 wherein the support assembly further comprises a platform assembly upon which the polymer filter frame bears and the cooperating components that allow controlled relative horizontal movement between the polymer filter frame and base comprise at least one rail on one of the platform assembly and base and a first slot on the other of the platform assembly and base, the one rail and first slot configured so that the one rail and first slot cooperate to guide movement of the polymer filter frame relative to the base in a substantially first linear path that is generally aligned with the flow path.

15. The polymer filter assembly according to claim 14 wherein the cooperating components that allow controlled relative horizontal movement between the polymer filter frame and base further comprise another rail and a second slot, the another rail and second slot provided one each on the platform assembly and base and configured so that the another rail and second slot cooperate to guide movement of the polymer filter frame relative to the base in a substantially second linear path that is substantially parallel to the first linear path.

16. The polymer filter assembly according to claim 15 wherein the platform assembly comprises a flat plate with a central plane that is horizontally oriented and the one rail and first slot and another rail and second slot cooperate between the flat plate and the base.

17. The polymer filter assembly according to claim 14 wherein the cooperating components that allow controlled relative vertical movement between the polymer filter frame and base comprise a plurality of spring assemblies that act between the platform assembly and polymer filter frame and exert an upward biasing force upon the polymer filter frame.

18. The polymer filter assembly according to claim 17 wherein the plurality of spring assemblies are configured and cooperate between the polymer filter frame and base to allow the polymer filter frame to be vertically angularly reoriented relative to the base.

19. The polymer filter assembly according to claim 17 wherein the polymer filter assembly further comprises an adjusting assembly through which the polymer filter frame can be shifted relative to the base in a direction transversely to the first linear path.

20. The polymer filter assembly according to claim 19 wherein through the adjusting assembly the polymer filter frame is shifted relative to the base in the direction transversely to the first linear path by changing a position of the one rail in the first slot in the direction transversely to the first linear path.

21. The polymer filter assembly according to claim 17 wherein the polymer filter assembly further comprises an adjusting assembly through which a vertical angular orientation of the one rail relative to the base is changed.

22. The polymer filter assembly according to claim 14 wherein the polymer filter assembly further comprises a height adjustment mechanism through which downward movement of the polymer filter assembly frame relative to the base is blocked with the polymer filter assembly frame at a plurality of different selectable heights relative to the base.

* * * * *